(12) United States Patent
Izumi et al.

(10) Patent No.: US 6,975,077 B2
(45) Date of Patent: Dec. 13, 2005

(54) HIGH INTENSITY DISCHARGE LAMP BALLAST APPARATUS

(75) Inventors: Kikuo Izumi, Tokyo (JP); Shigeki Harada, Tokyo (JP); Akihiko Iwata, Tokyo (JP); Takashi Ohsawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/898,242

(22) Filed: Jul. 26, 2004

(65) Prior Publication Data

US 2005/0057181 A1    Mar. 17, 2005

(30) Foreign Application Priority Data

Aug. 29, 2003  (JP) .............................. 2003-306961

(51) Int. Cl.⁷ .......................... H05B 37/02; G05F 1/00
(52) U.S. Cl. .................. 315/209 R; 315/291; 315/224; 315/DIG. 7
(58) Field of Search ............................ 315/209 R, 219, 315/291, 347

(56) References Cited

U.S. PATENT DOCUMENTS

| | | | | |
|---|---|---|---|---|
| 4,060,751 A | * | 11/1977 | Anderson ................ | 315/209 R |
| 5,028,846 A | * | 7/1991 | Lesea ........................ | 315/219 |
| 5,345,148 A | * | 9/1994 | Zeng et al. .............. | 315/209 R |
| 6,476,568 B2 | * | 11/2002 | Urakabe et al. ............. | 315/307 |
| 6,548,966 B2 | | 4/2003 | Kawasaka et al. .......... | 315/291 |
| 2003/0002300 A1 | * | 1/2003 | Nakamura ................ | 363/21.01 |
| 2003/0076053 A1 | * | 4/2003 | Kambara et al. ............ | 315/224 |
| 2003/0111967 A1 | * | 6/2003 | O'Meara ................. | 315/209 R |
| 2004/0100205 A1 | * | 5/2004 | Takahashi et al. .......... | 315/248 |

FOREIGN PATENT DOCUMENTS

| | | |
|---|---|---|
| JP | 57-44994 | 3/1982 |
| JP | 07-211472 | 8/1995 |

* cited by examiner

*Primary Examiner*—Thuy V. Tran
*Assistant Examiner*—Angela M Lie
(74) *Attorney, Agent, or Firm*—Leydig, Voit & Mayer, Ltd.

(57) ABSTRACT

A compact, low cost high intensity discharge lamp ballast apparatus which can carry out normal ballasting without extinction at discharge start includes a DC-AC inverting booster circuit, a first resonance circuit, and a second resonance circuit. The DC-AC inverting booster circuit includes a DC-AC converter transformer for converting a DC voltage fed from a DC power supply to an AC voltage in response to switching on and off of FETs, boosting the voltage. The first resonance circuit includes a leakage inductance connected in series with the secondary winding of the DC-AC converter transformer, and a first resonant capacitor connected in parallel with the secondary winding. The second resonance circuit includes a metal halide lamp, an ignitor transformer for producing a voltage to start lighting of the metal halide lamp, and a second resonant capacitor.

7 Claims, 6 Drawing Sheets

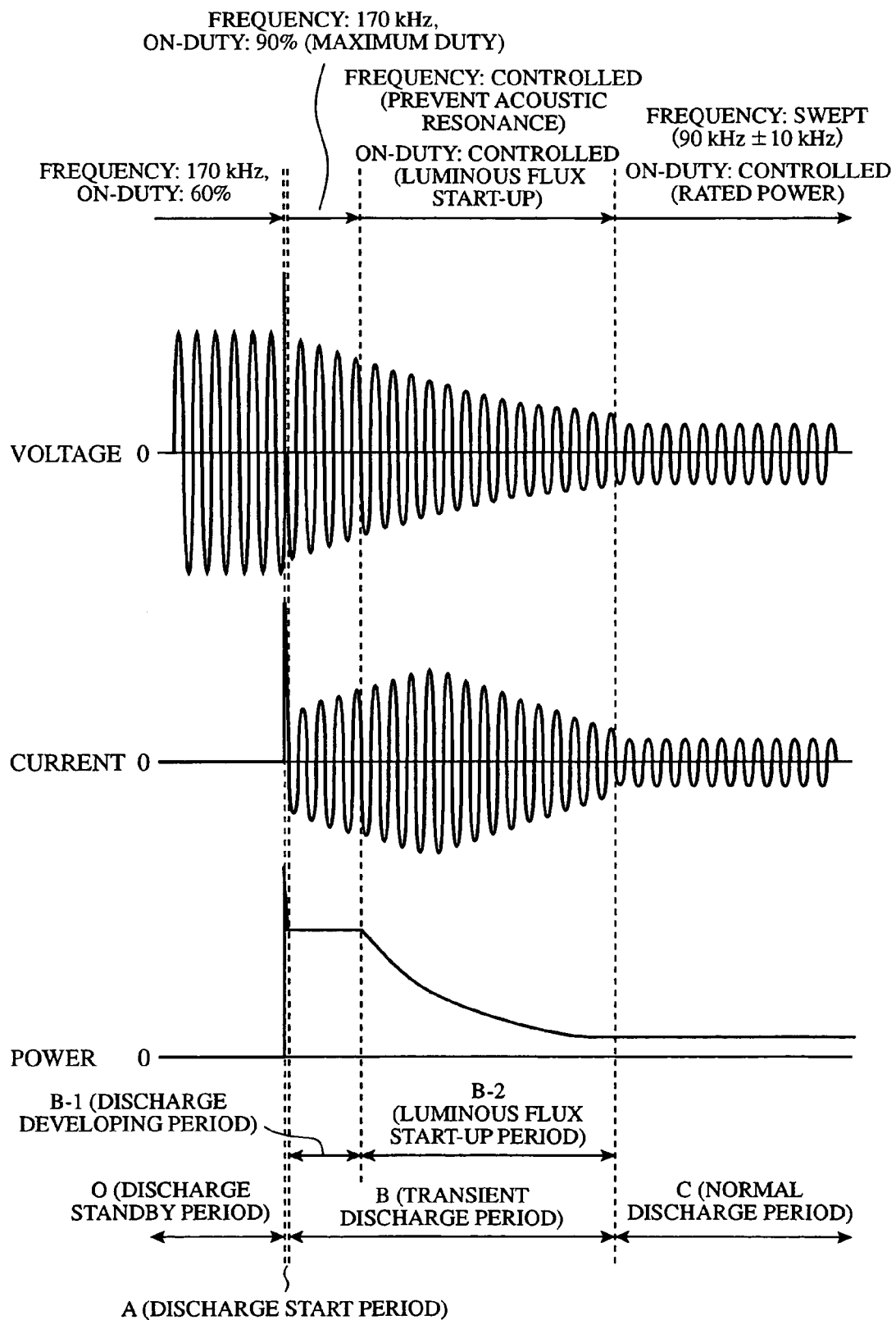

HIGH INTENSITY DISCHARGE LAMP BALLAST APPARATUS

BACKGROUND OF THE INVENTION

1. Field of the Invention

The present invention relates to a high intensity discharge lamp ballast apparatus.

2. Description of Related Art

Recently, metal halide lamps have been used as the headlights of an automobile instead of halogen lamps. The metal halide lamp, one of the HID (High Intensity Discharge) lamps, is characterized by its high luminous efficiency, high color temperature and long life compared with the halogen lamp. The arc tube of the metal halide lamp contains metal halides which are mixtures of some metals such as sodium and scandium with halogen such as iodine, high pressure xenon serving as a starting gas, and mercury. The metal halide lamp starts emitting light as follows. First, it starts discharge of the xenon in a gaseous condition at room temperature, followed by arc discharge of the xenon, which increases the temperature inside the arc tube. As the temperature in the tube increases, the mercury vaporizes and starts arc discharge, thereby further increasing the temperature in the tube. A further increase in the temperature in the tube brings about the evaporation of the metal halides, followed by their arc discharge, thereby achieving the high color temperature emission at high luminous efficiency. Incidentally, although the mercury serves as a stopgap of the discharge between the xenon and metal halides, metal halide lamps without containing the mercury have been provided recently.

In the ballast apparatus of the metal halide lamp, the densities of the substances in the gases vary greatly in the various phases of the temperature rise in the lamp ballast process. Thus, it is necessary for the ballast apparatus of the metal halide lamp to prevent the discharge from fading away because of a decrease in the electronic temperature, thereby continuing the discharge. In other words, it must control the discharge in response to the variable load characteristics of the lamp. Consequently, the ballast circuit of the metal halide lamp must meet unique requirements which differ greatly from the requirements for ballast circuits of fluorescent lamps (low-pressure mercury vaporization discharge lamps) widely used as normal household lighting and backlights of liquid crystal displays.

As the ballast apparatus of vehicle headlights using the conventional metal halide lamps, the technique disclosed in Relevant Reference 1 is known, for example. In the present specification, the circuit configuration described in Relevant Reference 1 is called "full-bridge, low-frequency ballast system" because of its circuit characteristics. Although the full-bridge, low-frequency ballast system can meet the requirements necessary for the metal halide lamp and implement a rather compact and inexpensive ballast apparatus, further reduction in size and cost is required.

On the other hand, as for the conventional ballast apparatuses of fluorescent lamps used as the backlights of liquid-crystal displays, a thoroughgoing reduction of their size and cost has been carried out as in a ballast apparatus described in Relevant Reference 2, for example. As a result, the systems have been widely used which convert voltages fed from DC power supplies to AC waves using push-pull DC-AC inverters to light the lamps at high frequencies. In the present specification, the circuit configuration disclosed in the Relevant Reference 2 is called "one-stage high frequency boosting inverter system" from its circuit characteristics. The one-stage high frequency boosting inverter system carries out the power conversion from DC to AC only once within the ballast circuit using a push-pull DC-AC inverter. Thus, it can simplify the circuit configuration, and miniaturize its transformer occupying a large portion of the total volume of the apparatus because of the high frequency turn-on, thereby being able to achieve the reduction in size and cost of the ballast apparatus. To apply the circuit scheme to the ballast apparatus of the metal halide lamp, the unique requirements of the metal halide lamp must be met, which prevents the implementation thereof.

Relevant Reference 1: Japanese patent application laid-open No. 2002-352989.

Relevant Reference 2: Japanese patent application laid-open No. 7-211472/1995.

In addition, the full-bridge, low-frequency ballast system separates its boosting DC-DC converter from the inverter for converting DC into AC to satisfy both the requirements to reduce the size of the transformer and to stabilize the high intensity discharge lamp. Thus, it requires the multi-stage conversion, which increases the number of the circuit components, and prevents the reduction in size and cost of the high intensity discharge lamp ballast apparatus.

It is necessary for the ballast apparatus of the metal halide lamp to generate a high voltage pulse of about 20 kV or more across the lamp to cause breakdown during the discharge start period. The full-bridge, low-frequency ballast system supplies the lamp with the high voltage pulse by applying the output voltage of the DC-DC converter to the transformer for starting electric discharge, which is called "ignitor transformer" from now on. In this case, the generating circuit of the high voltage pulse must increase the voltage to be supplied to the primary side of the start transformer to a considerable level to prevent an increase in the size of the ignitor transformer.

On the other hand, as for the circuit using the one-stage high frequency boosting inverter system, the transformer of the DC-AC inverter must have a large turn ratio or a booster circuit at its secondary side to generate the high voltage pulse at the start of the discharge. This increases the size of the transformer, and the number of the components, thereby presenting a problem of hampering the reduction in size and cost of the high intensity discharge lamp ballast apparatus.

In addition, to relight the metal halide lamp after extinguishing the arc after lighting the lamp for a while, the full-bridge, low-frequency ballast system has a discharge growing capacitor (capacitor for assisting to start electric discharge) with a comparatively high withstand voltage and comparatively large capacitance at the secondary side of the transformer to prevent the discharge from fading away, thereby supplying an enough voltage for maintaining the discharge of the metal halide lamp immediately after the discharge start. This presents a problem of hindering the reduction in cost and size of the high intensity discharge lamp ballast apparatus.

On the other hand, the circuit using the one-stage high frequency boosting inverter system employs the same frequency for driving the transformer and for ballasting the lamp according to its circuit configuration. As a result, to supply the lamp with the voltage necessary for the discharge growth, the transformer must have a large turn ratio or a capacitor with a large capacitance at the DC circuit portion on its primary side to temporarily increase the voltage across the capacitor. This increases the size and cost of the transformer and capacitor, and the number of components, thereby presenting a problem of preventing the reduction in size and cost of the high intensity discharge lamp ballast apparatus.

SUMMARY OF THE INVENTION

The present invention is implemented to solve the foregoing problems. It is therefore an object of the present invention to provide a compact, inexpensive high intensity discharge lamp ballast apparatus capable of turning on the metal halide lamp normally without flickering out at the discharge start by using the one-stage high frequency boosting inverter system.

According to one aspect of the present invention, there is provided a high intensity discharge lamp ballast apparatus comprising: a DC-AC inverter including at least one switching element for converting a DC voltage to an AC voltage, and a transformer for boosting the AC voltage; a first resonance circuit that is connected to an output side of the DC-AC inverter, and includes an inductance element and a first resonant capacitor; and a second resonance circuit that is connected to the first resonance circuit, that includes a high intensity discharge lamp, an ignitor transformer for generating a voltage for starting the high intensity discharge lamp, and a second resonant capacitor, and that supplies the high intensity discharge lamp with an output voltage of the DC-AC inverter effectively in conjunction with the first resonance circuit in accordance with individual discharge periods.

The high intensity discharge lamp ballast apparatus includes the DC-AC inverter for converting the DC voltage to the AC voltage with boosting it, and the first resonance circuit and second resonance circuit on the secondary side of the transformer of the DC-AC inverter. This makes it possible to downsize the circuit, and supply sufficient energy to the high intensity discharge lamp during the discharge developing period. As a result, it offers an advantage of being able to reduce the size of the apparatus that carries out the normal ballasting of the metal halide lamp.

BRIEF DESCRIPTION OF THE DRAWINGS

FIG. 2 is a diagram illustrating a sequence of the ballast control of the metal halide lamp of the embodiment 1 in accordance with the present invention;

DETAILED DESCRIPTION OF THE PREFERRED EMBODIMENT

The embodiment in accordance with the present invention will now be described with reference to the accompanying drawings.

EMBODIMENT 1

Figure 1:
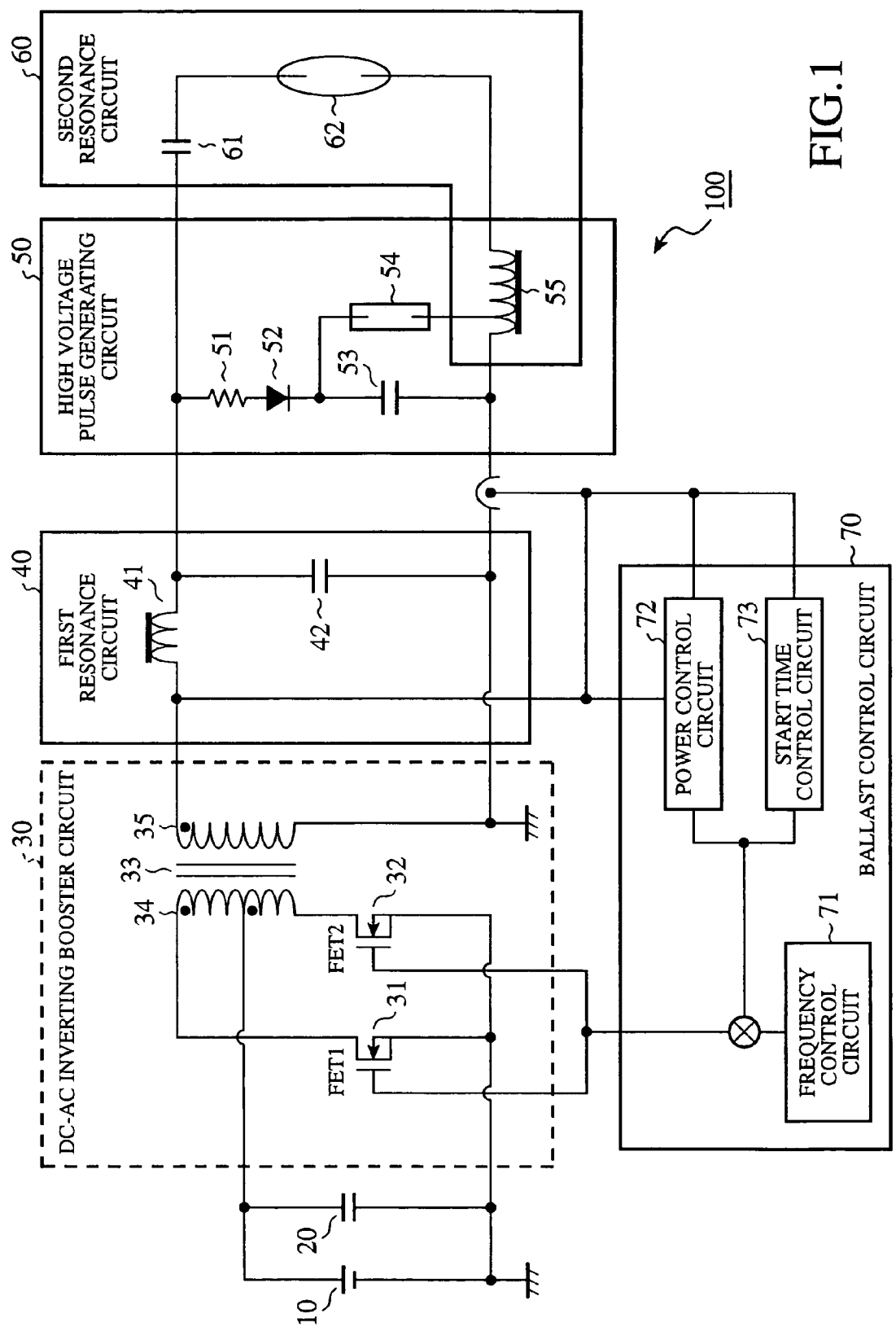
FIG. 1 is a circuit diagram showing a configuration of a metal halide lamp ballast apparatus 100 of an embodiment 1 in accordance with the present invention.

FIG. 1 is a circuit diagram showing a configuration of a metal halide lamp ballast apparatus 100 (high intensity discharge lamp ballast apparatus) of an embodiment 1 in accordance with the present invention. As shown in FIG. 1, the metal halide lamp ballast apparatus 100 includes a DC power supply 10 such as a battery, a smoothing capacitor 20, a DC-AC inverting booster circuit 30 (DC-AC inverter), a first resonance circuit 40, a high voltage pulse generating circuit 50, a second resonance circuit 60, and a ballast control circuit 70.

The DC-AC inverting booster circuit 30 has a FET (Field Effect Transistor) 31 and a FET 32 (switching element), and a DC-AC converter transformer 33 (transformer). The FETs 31 and 32 are each turned on and off in response to a pulse signal fed from the ballast control circuit 70 to their gates. Thus, the current flowing through the primary winding 34 of the DC-AC converter transformer 33 is altered so that a rectangular wave voltage is generated across the secondary winding 35. The rectangular wave voltage has a peak value greater than the voltage of the DC power supply 10 or the voltage across the smoothing capacitor 20 by a factor of the turn ratio of the DC-AC converter transformer 33.

The first resonance circuit 40 is composed of a leakage inductance 41, which is the leakage inductance component of the DC-AC converter transformer 33, and a first resonant capacitor 42. The first resonance circuit 40 can also be composed of an inductance element connected to the secondary winding 35 of the DC-AC converter transformer 33, and the first resonant capacitor 42.

The high voltage pulse generating circuit 50 includes a resistor 51, a diode 52, a capacitor 53, a spark gap switch 54, and an ignitor transformer 55 (ignitor transformer). The ignitor transformer 55 generates a voltage of about 20 kV to turn on the metal halide lamp 62. The capacitor 53 is charged via the resistor 51 and diode 52. When the voltage across the capacitor 53 reaches a threshold value, the spark gap switch 54 is turned on so that the voltage across the capacitor 53 is supplied to the primary winding of the ignitor transformer 55. Thus, the ignitor transformer 55 generates the high voltage pulse higher than the voltage across the primary winding by a factor of the turn ratio across the secondary winding.

The second resonance circuit 60 includes the ignitor transformer 55, a second resonant capacitor 61, and a metal halide lamp 62 (high intensity discharge lamp). The second resonance circuit 60 reduces its reactive power, which is generated by the inductance of the ignitor transformer 55 after the start of the discharge, through the second resonant capacitor 61, thereby facilitating the power supply to the metal halide lamp 62.

The ballast control circuit 70 is a circuit for modifying the ballast voltage waveform in accordance with the purpose, which includes a frequency control circuit 71, a power control circuit 72, and a start time control circuit 73.

Next, the operation of the metal halide lamp ballast apparatus 100 will be described.

The start process of the metal halide lamp includes four phases: O. Discharge standby period; A. Discharge start period; B. Transient discharge period; and C. Normal discharge period. The characteristics of the phases, A. Discharge start period, B. Transient discharge period, and C. Normal discharge period will be described.

A. Discharge Start Period.

The load condition of the metal halide lamp 62 in the discharge standby period (O) is equivalent to the capacitor, and its impedance is comparatively large of about a few megohms. The value of the impedance varies depending on the elapsed time from the end of the previous discharge. When the pressure in the tube is low because a sufficient time has elapsed from the end of the previous discharge, and the temperature in the tube drops to near the room temperature, the breakdown voltage is low. This state is called a "cold condition", here. In contrast with this, when the pressure in the tube is still high because not a sufficient time has elapsed from the end of the previous discharge, and the temperature in the tube is still high, the breakdown voltage is higher than that in the cold condition. This state is called a "hot condition", here. In the discharge start period, it is necessary to apply a high voltage of a few tens of kilovolts to the metal halide lamp 62 in order to positively generate the breakdown even in the hot condition in which the breakdown voltage is high.

B. Transient Discharge Period.

The transient discharge period is further divided into B-1. Discharge developing period and B-2. Luminous flux start-up period, which cannot be definitely divided in time, and are referred to as B. Transient discharge period generically. Generally, the discharge developing period is an interval from about a few tens of microseconds to several hundred microseconds from the ballast start, and the luminous flux start-up period is an interval from about a few milliseconds to several tens of seconds after the discharge developing period.

B-1. Discharge Developing Period.

As in the case before the breakdown described in connection with the A. Discharge start period, the impedance of the metal halide lamp 62 after the breakdown also depends on the elapsed time from the end of the previous discharge. When the discharge starts from the cold condition, the impedance of the metal halide lamp 62 sharply drops from a few megohms before the discharge start to several tens of ohms, followed by increasing to a few hundred ohms of a steady condition according to the ballast tube temperature of the metal halide lamp 62 and to an increase in the pressure. In contrast, when the discharge starts from the hot condition, the impedance of the metal halide lamp 62 drops from a few megohms to a few hundred ohms which is higher than the impedance in the steady condition because both ballast tube temperature and tube pressure are high, followed by reducing to the impedance in the steady condition gradually.

In the developing process of the discharge, unless sufficient energy for sustaining the discharge is supplied, the discharge becomes unstable and can be extinguished. Furthermore, in the cathode surface process of the discharge, sufficient energy must be supplied to emit thermoelectrons to continue the arc discharge. Accordingly, it is necessary to supply sufficient energy immediately after the breakdown to prevent the discharge from going out. As described above, the energy to be supplied to prevent the extinction of the discharge varies according to the conditions of the metal halide lamp 62 such as the pressure and temperature in the tube. When started from the cold condition, the major tube gas in the developing process is xenon, in which case since the tube pressure is low, the energy to be supplied is comparatively small. In contrast with this, when started from the hot condition, since the major tube gases in the developing process are xenon and mercury vapor, the tube pressure is high and the energy to be supplied increases.

B-2. Luminous Flux Start-Up Period.

The metal halide lamp 62 must produce a desired luminous flux in a predetermined time period. To achieve this, it is necessary to shift the process quickly up to the process of ionizing the metal halides through-the individual discharge periods. Therefore sufficient energy must be supplied to the metal halide lamp 62 by feeding power such as 70 W greater than the rated power of 35 W in the normal discharge period. In this case, the behavior of the lamp also varies in the hot condition and cold condition. Accordingly, the energy to be supplied must be adjusted depending on the hot condition or cold condition. More specifically, the impedance of the lamp after the breakdown is higher in the hot condition, moves to the impedance in the steady condition more rapidly, and reaches the desired luminous flux more quickly. Consequently, supplying the energy for the development and luminous flux start-up in the hot condition for the same time period as in the cold condition results in excessive energy supply, thereby reducing the life of the lamp. On the contrary, if the energy for the discharge development and luminous flux start-up is not supplied for a sufficient time period in the cold condition, the discharge can be extinguished, or the time taken to produce the desired luminous flux is prolonged.

C. Normal Discharge Period.

During the normal lighting by the arc discharge of the metal halides, the rated power of 35 W must be maintained, and the stable discharge must be sustained. As for the metal halide lamp 62, since the ballast frequency is one of the most important factors, it is necessary to select a suitable frequency to prevent unstable discharge due to acoustic resonance, which will be described later.

The operation of the metal halide lamp ballast apparatus 100 will now be described in accordance with the foregoing four phases.

In the present embodiment 1, unless otherwise specified, it is assumed that a car battery is used as the DC power supply 10, and the power supply voltage is 12 V. In addition, it is assumed that the turn ratio of the DC-AC converter transformer 33 is 1:17, the leakage inductance 41 of the DC-AC converter transformer 33 is 0.35 mH, the first resonant capacitor 42 is 3 nF, the inductance of the ignitor transformer 55 is 1 mH, and the second resonant capacitor 61 is 3.5 nF. Furthermore, it is assumed in the high voltage pulse generating circuit 50 that the resistor 51 is 5 kΩ, the capacitor 53 is 0.1 μF, and the spark gap switch 54 is turned on at 800 V.

FIG. 2 is a diagram illustrating a sequence of the ballast control of the metal halide lamp 62 of the metal halide lamp ballast apparatus 100 in the present embodiment 1. In FIG. 2, the periods A, B-1, B-2, C, and O correspond to the individual phases, and FIG. 2 illustrates the driving frequencies and on-duties of the FETs 31 and 32 controlled by the ballast control circuit 70 in the individual periods. The on-duty of the FET 31 or FET 32 refers to the ratio of the time period during which the signal for turning on the FETs 31 and 32 is output, under the assumption that half the period of the gate pulse signal of the FETs 31 and 32 fed from the ballast control circuit 70 is 100%.

The ballast control circuit 70 has the frequency control circuit 71 determine the drive frequency of the ballast, has the power control circuit 72 detect the voltage and current, and controls the power to be supplied to the metal halide lamp 62 by varying the on-duty. In addition, the ballast control circuit 70 has the start time control circuit 73 operate the spark gap switch in the discharge standby period, thereby controlling the energy to be supplied to the metal halide lamp 62 to maintain the discharge during the discharge developing period.

First, the operation in the discharge standby period (O) will be described.

When the lighting switch (not shown) of the metal halide lamp 62 is turned on, the ballast control circuit 70 supplies the FETs 31 and 32 with the gate pulse signal. Thus, the FETs 31 and 32 turns on and off repeatedly, thereby generating a rectangular wave voltage with a peak value greater than the power supply voltage by a factor of the turn ratio of the DC-AC converter transformer 33 across the secondary winding 35 of the DC-AC converter transformer 33. In this case, the driving frequency of the FETs 31 and 32 is preferably about 100 kHz or more to prevent upsizing of the DC-AC converter transformer 33. Here, the driving frequency is assumed to be 170 kHz as illustrated in FIG. 2.

Since the metal halide lamp ballast apparatus 100 of the present embodiment 1 employs the one-stage high frequency boosting inverter system described in the related art, it can eliminate the need for a high-frequency switch for the DC-DC converter, which is required by the conventional full-bridge, low-frequency ballast system. Accordingly, it can utilize the ability to dissipate the heat generated by the high-frequency switch to dissipate the heat generated by the switching elements of the DC-AC inverting booster circuit 30. Thus, even when the driving frequency of the FETs 31 and 32 are increased, they can be operated without adding any new heat sink.

Figure 3A:
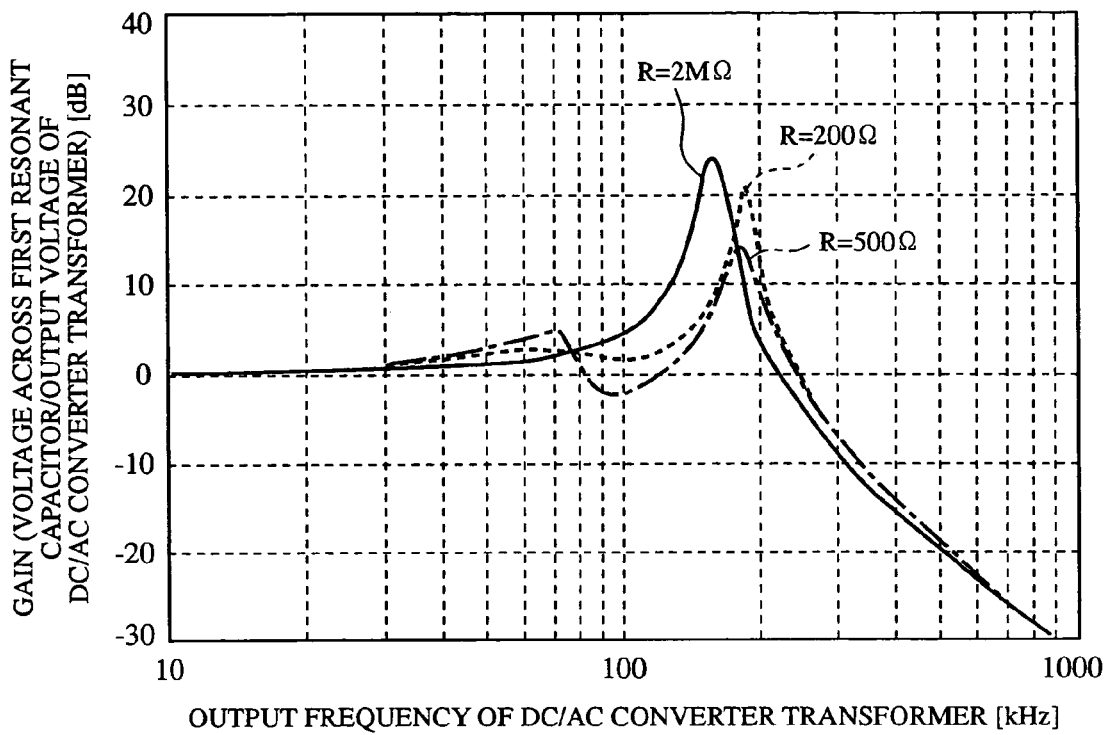
FIGS. 3A and 3B are graphs illustrating transfer characteristics on the side of a secondary winding 35 of a DC-AC converter transformer 33.
Figure 3B:
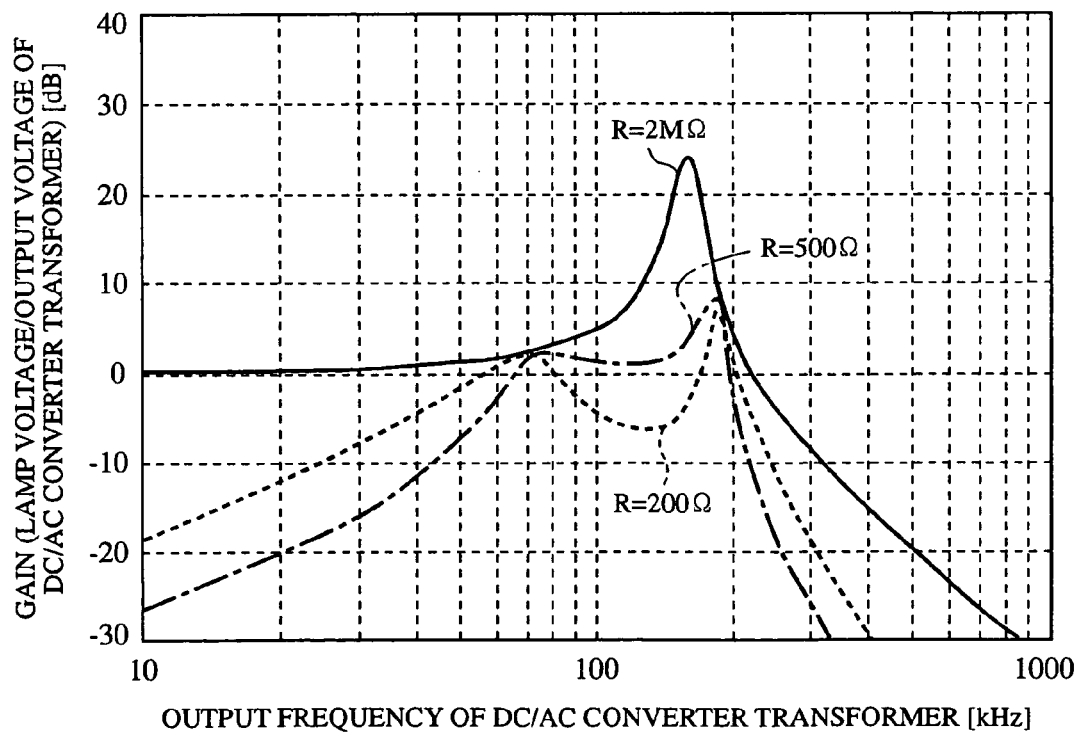

When the rectangular wave voltage with the peak value of about 200 V is generated across the secondary winding 35 of the DC-AC converter transformer 33 by the operation of the FETs 31 and 32, a current flowing through the first resonance circuit 40 generates a voltage across the first resonant capacitor 42. The voltage generated depends on the transfer characteristic on the side of the secondary winding 35 of the DC-AC converter transformer 33, and on the driving frequency of the FETs 31 and 32 and the impedance of the metal halide lamp 62 as illustrated in FIGS. 3A and 3B. This means that the voltage generated depends on the current flowing through the first resonance circuit 40. Thus, the output voltage of the first resonance circuit 40 depends on the on-duty of the FETs 31 and 32, as well.

As described above, the impedance of the metal halide lamp 62 is sufficiently large on the order of a few megohms during the discharge standby period. Accordingly, when the driving frequency of the FETs 31 and 32 is constant, and the capacitance of the first resonant capacitor 42 is constant, the output voltage of the first resonant capacitor 42 depends on only the on-duty of the FETs 31 and 32.

Figure 4:
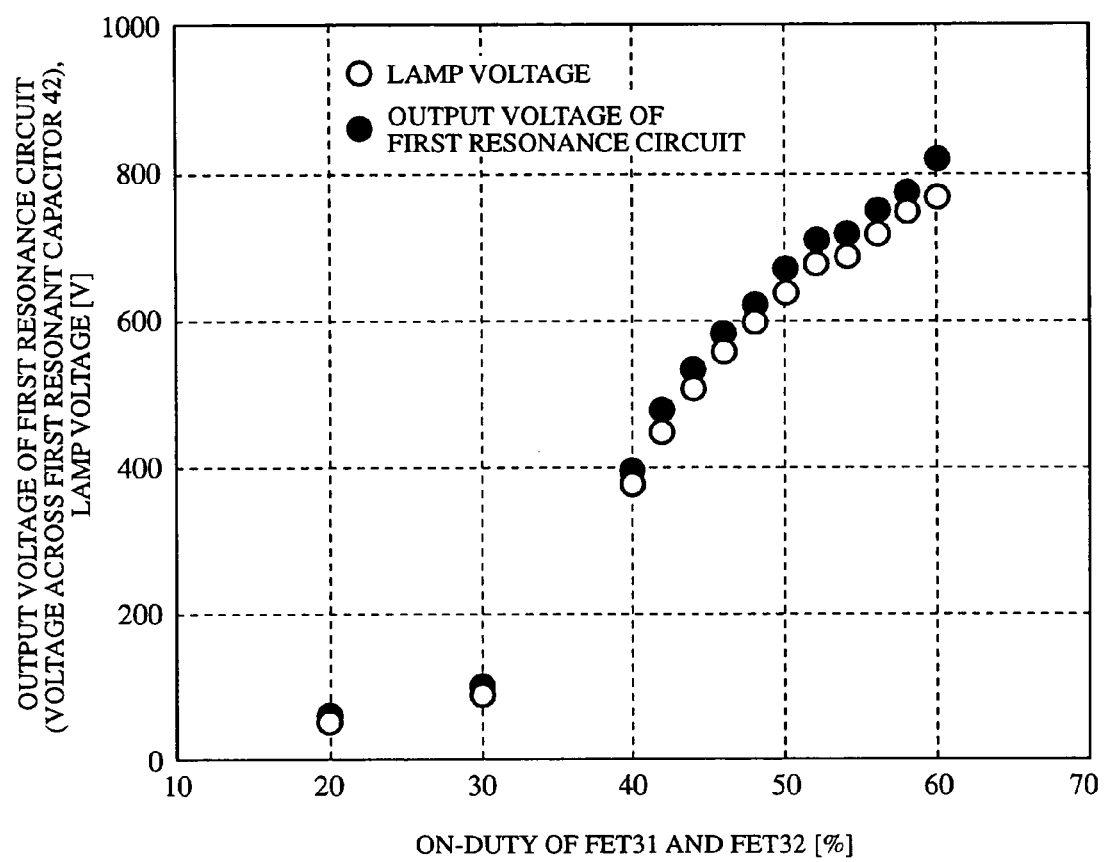
FIG. 4 is a graph illustrating relationships between the on-duties of FETs 31 and 32 and the output voltage of a first resonance circuit 40 (the voltage across a first resonant capacitor 42) and the peak values of the voltage of the metal halide lamp 62.

FIG. 4 shows the relationships between the on-duty of the FETs 31 and 32, and the output voltage of the first resonance circuit 40 (voltage across the first resonant capacitor 42), and the peak value of the voltage of the metal halide lamp 62, when the driving frequency of the FETs 31 and 32 is 170 kHz. As illustrated in FIG. 4, the output of the first resonance circuit 40 and the voltage of the metal halide lamp 62 each depend on the on-duty of the FETs 31 and 32.

During the discharge standby period, the capacitor 53 must be charged up to the on-voltage of the spark gap switch 54.

When a voltage is generated across the first resonant capacitor 42, and the output of the first resonance circuit 40 is positive, that is, when the upper side of the first resonant capacitor 42 is positive in FIG. 1, the diode 52 of the high voltage pulse generating circuit 50 conducts, and the capacitor 53 is charged. In contrast, when the output of the first resonance circuit 40 is reversed, and its output becomes negative, that is, when the upper side of the first resonant capacitor 42 becomes negative in FIG. 1, the diode is brought out of conduction, and the capacitor 53 is not charged. In other words, the voltage across the capacitor 53 is equal to the peak value of the output voltage of the first resonance circuit 40. When the driving frequency of the FETs 31 and 32 is set at 170 kHz, at which the transfer characteristic of the secondary side of the DC-AC converter transformer 33 becomes maximum, and the on-duty is set at 60% as illustrated in FIG. 4, the output voltage of the first resonance circuit 40 can be placed at 800 V. Thus, the spark gap switch 54 can be boosted up to 800 V.

Incidentally, when the output of the first resonance circuit 40 is negative, the diode 52 of the high voltage pulse generating circuit 50 is supplied with the sum of the voltage across the capacitor 53 and the negative side peak voltage of the first resonance circuit 40. Accordingly, the diode 52 must have a withstand voltage twice the peak value of the output voltage of the first resonance circuit 40.

In addition, to reduce the withstand voltage of the first resonant capacitor 42, the on-duty of the FETs 31 and 32 is controlled such that the output voltage of the first resonance circuit 40 does not exceed 800 V. This is because an increase in the withstand voltage of the first resonant capacitor 42 brings about an increase in the size of the capacitor.

The time taken by the capacitor 53 to be charged to the on-voltage of the spark gap switch 54 is determined by the time constant defined by the product of the resistor 51 and the capacitor 53, and by the output frequency of the first resonance circuit 40.

Next, the operation during the discharge start period (A) will be described.

When the voltage of the capacitor 53 rises up to 800 V, the spark gap switch 54 is turned on so that the voltage of 800 V is applied to the primary winding of the ignitor transformer 55, thereby generating the voltage boosted by a factor of the turn ratio across the secondary winding. Here, the turn ratio between the primary winding and the secondary winding of the ignitor transformer 55 is assumed to be 6:220. In this case, the voltage of about 30 kV is generated across the secondary winding, and is applied to the electrodes of the metal halide lamp 62. Since the voltage exceeds the breakdown voltage in both the cold condition and hot condition, the breakdown occurs.

Next, the operation of the metal halide lamp ballast apparatus 100 during the discharge developing period (B-1) in the transient discharge period will be described.

The FETs 31 and 32 continue turning on and off after the breakdown of the metal halide lamp 62 to supply power to the metal halide lamp 62. As described above, during the discharge developing period after the breakdown, it is necessary to supply the metal halide lamp 62 with the energy required according to the conditions of the metal halide lamp 62 to prevent the discharge from being extinguished. Since the impedance of the metal halide lamp 62 during the discharge developing period varies depending on the conditions of the metal halide lamp 62, the energy required to prevent the extinction of the discharge also varies.

As for the impedance of the metal halide lamp 62 after the breakdown in the cold condition, since it is comparatively low of about several tens of ohms, the extinction of the discharge of the metal halide lamp 62 can be prevented by applying comparatively low voltage. In contrast with this, as for the impedance of the metal halide lamp 62 after the breakdown in the hot condition, since it is rather high of a few hundred ohms or more, the extinction of the discharge cannot be prevented unless the comparatively high voltage is applied to the metal halide lamp 62. Accordingly, it is better to match the voltage to be supplied to the metal halide lamp 62 during the discharge developing period to the voltage applied after the breakdown in the hot condition.

The full-bridge, low-frequency ballast system has a large capacitance capacitor in a DC circuit portion between the secondary side of the DC-DC converter and the inverter to supply the metal halide lamp 62 with the energy required to maintain the discharge, and charges the capacitor with the DC current, thereby applying the DC voltage to the metal halide lamp 62.

The metal halide lamp ballast apparatus 100 of the present embodiment 1, however, employs the one-stage high frequency boosting inverter system so that the DC circuit portion is limited to the section consisting of the DC power supply 10 and smoothing capacitor 20 before the primary side of the DC-AC converter transformer 33. To connect a capacitor in this portion as in the conventional system, a capacitor with a larger capacitance than in the conventional system is required because of the lower charge voltage. In addition, to supply the metal halide lamp 62 with the voltage required, it is necessary to use the DC-AC converter transformer 33 with a large turn ratio, or to add a circuit for temporarily boosting the voltage of the capacitor, which hampers the reduction in the size and cost of the apparatus. In view of this, the present embodiment 1 uses a system that amplifies the output voltage of the DC-AC converter transformer 33 by the first resonance circuit 40.

Figure 5:
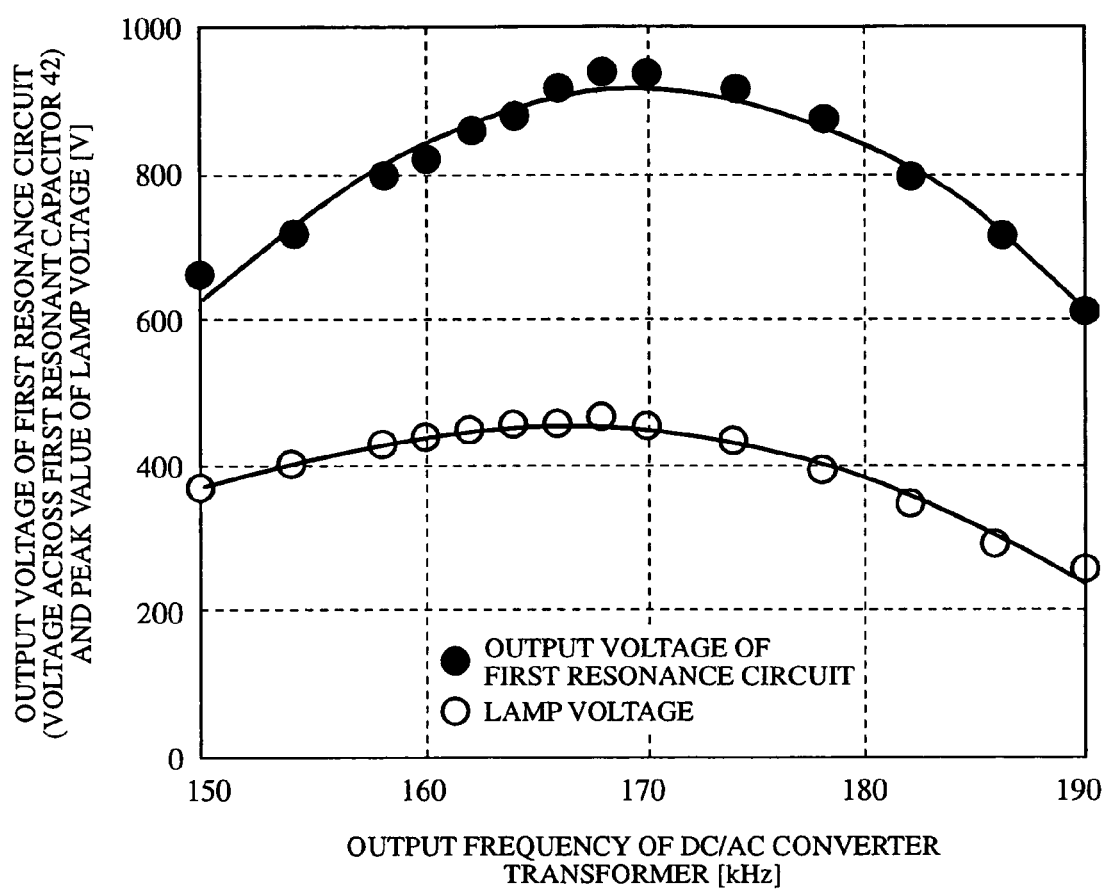
FIG. 5 is a graph illustrating relationships between the driving frequency of the FETs 31 and 32 and the output voltage of the first resonance circuit 40 (the voltage across the first resonant capacitor 42) and the peak values of the voltage of the metal halide lamp 62.

As an example, FIG. 5 illustrates the relationships between the driving frequency of the FETs 31 and 32, and the output voltage of the first resonance circuit 40 (voltage across the first resonant capacitor 42), and the voltage of the metal halide lamp 62, when the discharge is started in the hot condition and the impedance of the metal halide lamp 62 is 500 Ω. In FIG. 5, the on-duty of the FETs 31 and 32 is constant at 90%.

As illustrated in FIG. 5, when the driving frequency of the FETs 31 and 32 is 170 kHz, the voltage of the metal halide lamp 62 becomes maximum. In other words, to supply the metal halide lamp 62 with a voltage high enough, the FETs 31 and 32 must be driven at the frequency at which the gain becomes maximum in the transfer characteristic on the side of the secondary winding 35 of the DC-AC converter transformer 33, when the impedance of the metal halide lamp 62 as illustrated in FIGS. 3A and 3B is 500 Ω.

In addition, to supply the metal halide lamp 62 with the energy sufficient to sustain its discharge, the current to be supplied to the metal halide lamp 62 must be made maximum. To achieve this, it is preferable that the on-duty of the FETs 31 and 32 take a maximum value immediately after the discharge start.

In summary, as for the circuit using the one-stage high frequency boosting inverter system as the metal halide lamp ballast apparatus 100 of the present embodiment 1, it is preferable that the FETs 31 and 32 be driven at the frequency, at which the output of the resonance circuit on the side of the secondary winding 35 of the DC-AC converter transformer 33 becomes maximum during the discharge developing period, and that the on-duty become maximum in this case.

To implement such a sequence, the present embodiment 1 drives the FETs 31 and 32 at the frequency 170 kHz, at which the transfer function on the side of the secondary winding 35 of the DC-AC converter transformer 33 becomes maximum, during the discharge standby period, and adjusts the on-duty after starting the discharge such that the on-duty takes the maximum value of 90% instantaneously with maintaining the frequency at 170 kHz, thereby developing the discharge.

Figure 6:
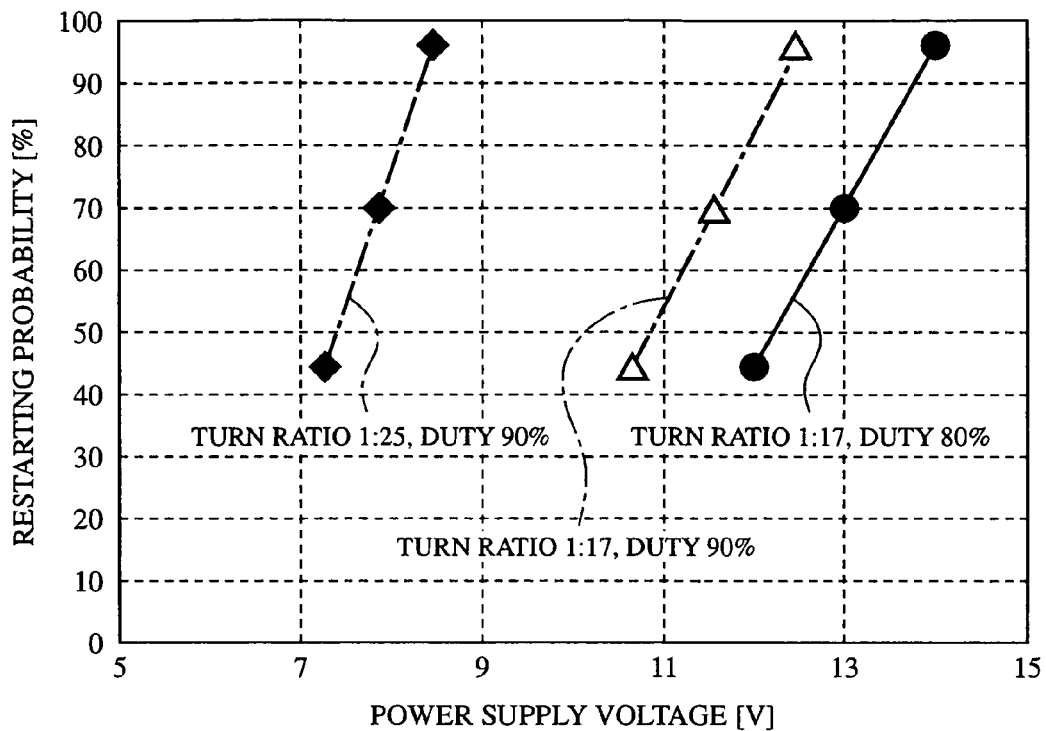
FIG. 6 is a graph illustrating restarting probabilities (in the worst restarting conditions) of the metal halide lamp 62 under a plurality of conditions in the embodiment 1.

FIG. 6 illustrates the summary of the restarting probabilities after ten seconds has elapsed after lighting the metal halide lamp 62 for a while using the foregoing sequence in terms of the power supply voltage and various conditions. As for the individual constants of the circuit, the foregoing values are used.

In FIG. 6, a higher power supply voltage on the same characteristic line indicates the higher output voltage of the first resonance circuit 40. As illustrated in FIG. 6, nearly 100% restarting probability is obtained at the power supply voltage 14 V, when the turn ratio of the DC-AC converter transformer 33 is 1:17, and the on-duty of the FETs 31 and 32 is 80%. In contrast with this, nearly 100% restarting probability is obtained at the power supply voltage 12 V, when the turn ratio is the same (1:17), and the on-duty of the FETs 31 and 32 is 90%. Thus setting the on-duty of the FETs 31 and 32 at a value as close to 100% as possible can ensure the relighting at a less transformer turn ratio. A reduction of the turn ratio of the transformer enables its downsizing.

The voltage range of the power supply at the ballast start of the metal halide lamp 62 is assumed to be from 9 V to 16 V considering the variations of the vehicle-mounted battery. As for the power supply voltage of 9 V, nearly 100% restarting probability is achieved when the transformer turn ratio is 1:25, and the on-duty of the FETs 31 and 32 is 90%. The transformer turn ratio can be reduced by varying the parameters of the first resonance circuit 40 and the ignitor transformer 55 and second resonant capacitor 61 of the second resonance circuit 60 in FIG. 1, and by thus varying the output of the first resonance circuit 40.

Next, the operation of the metal halide lamp ballast apparatus 100 in the luminous flux start-up period (B-2) in the transient discharge period will be described.

In the luminous flux start-up period, when the metal halide lamp 62 is in the cold condition, it is supplied with a power greater than its rated power of 35 W, such as 70 W, to start up to the desired luminous flux quickly. The power is adjusted by varying the on-duty of the FETs 31 and 32. In the hot condition, since the tube temperature is still in a high temperature, the start-up period is shorter than that of the cold condition.

Here, the driving frequency of the FETs 31 and 32 will be described. Up to the discharge developing period after the discharge standby period and discharge start period, it is not necessary to set the driving frequency of the FETs 31 and 32 at a specified frequency as long as it can provide the voltage and current required in the individual periods. The frequency varies depending on the values of the capacitors and inductances of the circuit on the side of the secondary winding 35 of the DC-AC converter transformer 33. In contrast, the driving frequency must be adjusted according to the unique characteristic of the metal halide lamp 62 in the luminous flux start-up period and normal discharge period.

The unique characteristic of the metal halide lamp 62 refers to a phenomenon that the discharge becomes unstable or is extinguished when the metal halide lamp 62 is driven at a frequency of a few kilohertz to light it, which is generally called "acoustic resonance". The details of the acoustic resonance are reported in the Journal of the Illuminating Engineering Institute of Japan Vol. 77, No. 10, 1993, pp. 29–36. According to the paper, the mechanism of causing the instability of the arc discharge due to the acoustic resonance is explained as follows. The frequency of the progressive waves in the reflection directions of each other within the lamp approaches the natural frequency of the lamp, thereby generating a standing wave. The standing wave, which is a compression wave of the mercury vapor dominating the lamp during lighting, brings about nonuniform pressure distribution within the lamp. In the pressure distribution, the arc discharge is formed such that the energy state becomes minimum, thereby bending the arc. The frequency at which the discharge in stability due to the acoustic resonance occurs varies depending on the acoustic wave in the tube. In other words, it varies depending on the tube pressure and temperature.

The luminous flux start-up period constitutes a part of the transient discharge period, and its duration ranges from a few milliseconds to several tens of seconds. The tube pressure and temperature during the period vary depending on the supply power and elapsed time, and on the initial conditions of the metal halide lamp 62 as well. Hence, they are not determined uniquely. When the metal halide lamp 62 is driven at a fixed frequency during the luminous flux start-up period, the acoustic resonance can occur depending on the conditions of the ballast tube, causing flickering or extinction of the metal halide lamp 62.

To circumvent the flickering or extinction of the discharge due to the acoustic resonance caused by the tube pressure and temperature varying in the luminous flux start-up period, the following two methods are conceived.

The first method detects the variations in the voltage of the metal halide lamp 62, and carries out the control such that when the variations in the voltage of the metal halide lamp 62 increase, it adjusts the frequency to reduce the variations.

The method utilizes the fact that the acoustic resonance brings about the bending of the arc which varies the impedance of the metal halide lamp 62 greatly, and hence varies the voltage supplied to the metal halide lamp 62. In contrast, as long as the acoustic resonance does not occur, the impedance of the metal halide lamp 62 is stable, and the variations in the voltage are small. Thus, the acoustic resonance is preventable by detecting the variations in the voltage and by setting the frequency in such a manner that the variations do not increase.

Another method counts the elapsed time from the end of the previous discharge, and starts the discharge after setting the frequency in accordance with the elapsed time.

The method determines the frequency to be used in the luminous flux start-up period by deciding the initial condition of the metal halide lamp 62 from the elapsed time from the end of the previous lighting, and from the values obtained from the past experiences. This is because the tube temperature and pressure of the metal halide lamp 62 depend on the initial condition of the metal halide lamp 62 to some extent. In this case, it is not necessary to fix the frequency throughout the luminous flux start-up period, but the temporal variations in the frequency can be carried out according to the values obtained from the past experiences.

The two methods, however, must set the frequency in such a range as enabling the start up of the luminous flux in a specified time period by adjusting the on-duty of the FETs 31 and 32 considering the transfer characteristic on the side of the secondary winding 35 of the DC-AC converter transformer 33.

Next, the operation of the metal halide lamp ballast apparatus 100 in the normal discharge period (C) will be described.

Once the luminous flux has started up, the normal discharge period starts, in which the discharge is continued at the rated power of 35 W by adjusting the on-duty of the FETs 31 and 32. The 35 W constant control is carried out as follows. First, the ballast control circuit 70 in FIG. 1 acquires the voltage and current of the circuit on the side of the secondary winding 35 of the DC-AC converter transformer 33. Then, it compares the present power with the steady power of 35 W, and supplies the FETs 31 and 32 with the gate pulse signal of the required on-duty.

To avoid the unstable discharge due to the acoustic resonance in the normal discharge period, a frequency sweep method that modulates the frequency is employed to generate a waveform for ballast driving. In the embodiment 1, the ballast driving is carried out by the waveform with the center frequency of 90 kHz, modulation frequency of 1 kHz, minimum frequency of 80 kHz and maximum frequency of 100 kHz. In addition, the ballast driving can be carried out continuously with the frequency swept waveform from the discharge standby period to the end of the ballast.

Figure 7:
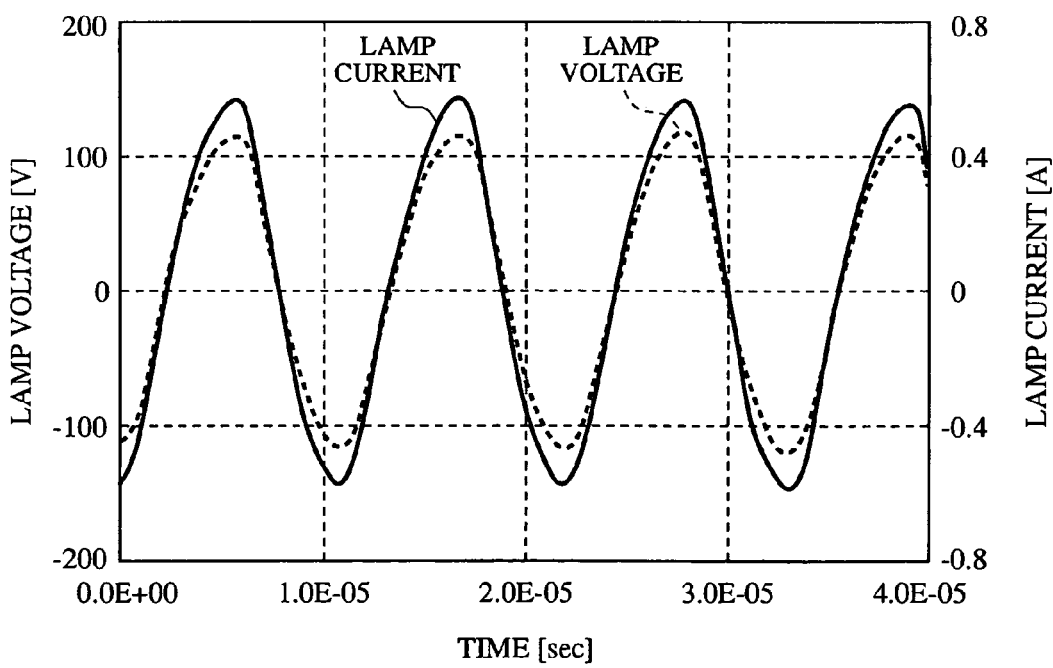
FIG. 7 is a graph illustrating voltage and current waveforms of the metal halide lamp 62 in a normal discharge period.

FIG. 7 illustrates an example of the voltage and current waveforms of the metal halide lamp 62 in the normal ballast mode. As illustrated in FIG. 7, the output voltage of the DC-AC converter transformer 33, which is a rectangular wave, is transformed into a waveform similar to a sinusoidal wave, and is applied to the metal halide lamp 62. This is because of the two-stage resonance circuit consisting of the first resonance circuit 40 and second resonance circuit 60 operating throughout the individual periods of ballasting the metal halide lamp 62. In other words, the two-stage resonance circuit serves as the electric filter so that the waveform fed to the metal halide lamp 62 does not include unexpected harmonics, thereby making it possible to control the ballast at the intended frequency.

As described above, the present embodiment 1 employs the "one-stage high frequency boosting inverter system" that converts the voltage from the DC power supply 10 to an AC waveform by the DC-AC inverting booster circuit 30, and lights the metal halide lamp 62 at a high frequency. In addition, the first resonance circuit 40, which is placed on the side of the secondary winding 35 of the DC-AC converter transformer 33 and includes the leakage inductance 41 of the DC-AC converter transformer 33 and the first resonant capacitor 42, can supply sufficient energy to the metal halide lamp 62 during the discharge developing period. Accordingly, the present embodiment 1 can simplify the circuit configuration, offering an advantage of being able to reduce the size and cost of the apparatus for normally ballasting the metal halide lamp 62.

In addition, utilizing the leakage inductance 41 of the DC-AC converter transformer 33 for configuring the first resonance circuit 40 can achieve the reduction in size and cost of the circuit without adding any new inductance.

Furthermore, the high voltage pulse generating circuit 50 offers an advantage of being able to reduce the size and cost of the circuit. This is because the high voltage pulse generating circuit 50 obviates the need for increasing the turn ratio of the DC-AC converter transformer 33, or for adding a new booster circuit on the secondary side of the DC-AC inverting booster circuit 30 to produce the voltage to be supplied to the primary winding of the ignitor transformer 55 for starting the ballast of the metal halide lamp 62.

Moreover, the present embodiment 1 can output the voltage necessary for sustaining the discharge in the individual periods from the start of the discharge up to the normal ballast by only connecting the first resonant capacitor 42 with a comparatively low capacitance to the secondary winding 35 of the DC-AC converter transformer 33. Thus, the present embodiment 1 can remove the capacitor with a comparatively large capacitance that is used by the full-bridge, low-frequency ballast system, thereby offering an advantage of being able to reduce the size and cost of the apparatus for ballasting the metal halide lamp 62.

Besides, the ballast control circuit 70 is configured such that it controls the driving frequency and on-duty of the FETs 31 and 32 in response to the conditions in the individual ballast periods of the metal halide lamp 62. As a result, it can prevent the extinction of the discharge and maintain the stable discharge without adding any new circuit for producing the voltages required for the individual periods of the discharge.

In addition, the present embodiment 1 includes the two-stage resonance circuit consisting of the first resonance circuit 40 and second resonance circuit 60 in the output circuit on the side of the secondary winding 35 of the DC-AC converter transformer 33. The resonance circuit serves as the electric filter that transforms the voltage across the secondary winding 35 of the DC-AC converter transformer 33, which is a rectangular wave, into a waveform similar to a sinusoidal wave applied to the metal halide lamp 62 throughout the individual discharge periods. This makes it possible to obviate the need for considering unexpected harmonics, and to carry out the stable ballast control at the intended frequency.

Furthermore, the embodiment 1 is configured such that the ballast control circuit 70 detects the voltage rise of the metal halide lamp 62 during the luminous flux start-up period in which the pressure and temperature within the metal halide lamp 62 vary sharply, and controls the driving frequency of the FETs 31 and 32 to suppress the variations in the voltage. As a result, the present embodiment 1 can eliminate flickering of the lamp due to the acoustic resonance, and start up the luminous flux within the specified time period.

Moreover, the ballast control circuit 70 is configured such that it measures the elapsed time from the end of the previous lighting to the start of the next lighting, and drives the metal halide lamp 62 at the frequency corresponding to the elapsed time. As a result, the present embodiment can prevent flickering of the arc light due to the acoustic resonance, and can start up the luminous flux in a predetermined time period.

Finally, the present embodiment 1 transforms the voltage waveform to be supplied to the metal halide lamp 62 into a frequency swept waveform during the normal discharge period. As a result, the present embodiment 1 can eliminate the flickering of the lamp, and maintain the stable ballasting.

What is claimed is:

1. A high intensity discharge lamp ballast apparatus comprising:
   a DC-AC inverter including at least one switching element for converting a DC voltage to an AC voltage, and a transformer for boosting the AC voltage;
   a first resonance circuit that is connected to an output side of said DC-AC inverter, and includes an inductance element and a first resonant capacitor; and
   a second resonance circuit that is connected to said first resonance circuit, that includes a high intensity discharge lamp, an ignitor transformer for generating a voltage for starting said high intensity discharge lamp, and a second resonant capacitor, and that supplies said high intensity discharge lamp with an output voltage of said DC-AC inverter in conjunction with said first resonance circuit in accordance with individual discharge periods.

2. The high intensity discharge lamp ballast apparatus according to claim 1, wherein said inductance element comprises leakage inductance of the transformer of said DC-AC inverter.

3. The high intensity discharge lamp ballast apparatus according to claim 1, further comprising a high voltage pulse generating circuit including a spark gap switch for receiving the output voltage of said DC-AC inverter via said first resonance circuit and for generating a voltage on a primary side of said ignitor transformer, and a capacitor for storing a voltage for turning on said spark gap switch.

4. The high intensity discharge lamp ballast apparatus according to claim 3, further comprising:
   a ballast control circuit for controlling frequency and duty ratio for driving the switching element of said DC-AC inverter to supply said high intensity discharge lamp with power required in the individual periods from a discharge start period to a normal discharge period, wherein said high intensity discharge lamp ballast apparatus drives said high intensity discharge lamp:
      in a discharge standby period, at a frequency and a duty ratio enabling boosting to a voltage that turns on said spark gap switch for generating a voltage across a primary side of said ignitor transformer;
      in a discharge developing period, at a frequency and a duty ratio maximizing transfer efficiency of a circuit on a secondary side of said transformer of said DC-AC inverter;
      in a luminous flux start-up period, at a frequency and a duty ratio producing stable start up of luminous flux in a specified time period; and
      in a normal discharge period, at a frequency and a duty ratio providing a specified supply of power to said high intensity discharge lamp to maintain stable discharge.

5. The high intensity discharge lamp ballast apparatus according to claim 4, wherein said ballast control circuit, in the luminous flux start-up period, detects variations in the voltage of said high intensity discharge lamp, controls the frequency for driving said switching element at a frequency that suppresses the variations in the voltage of said high intensity discharge lamp and stabilizes the discharge, and supplies said high intensity discharge lamp with power required for luminous flux start-up by adjusting the duty ratio in accordance with the frequency.

6. The high intensity discharge lamp ballast apparatus according to claim 4, wherein said ballast control circuit, in the luminous flux start-up period, sets the frequency and duty ratio for driving said switching element according to elapsed time from ending of previous lighting of said high intensity discharge lamp, before turning on said high intensity discharge lamp.

7. The high intensity discharge lamp ballast apparatus according to claim 1, wherein said first resonance circuit and said second resonance circuit supply said high intensity discharge lamp with the output voltage of said DC-AC inverter after smoothing the output voltage of said DC-AC inverter.

* * * * *